United States Patent [19]

Kullmann et al.

[11] 4,429,571
[45] Feb. 7, 1984

[54] COMPOUND LIQUID FLOW METER

[75] Inventors: Donald J. Kullmann; William G. Karjalainen; Rodney G. Harris, all of Tallassee, Ala.

[73] Assignee: Neptune Water Meter Company, Tallassee, Ala.

[21] Appl. No.: 358,842

[22] PCT Filed: Jun. 13, 1980

[86] PCT No.: PCT/US80/00763
§ 371 Date: Jan. 25, 1982
§ 102(e) Date: Jan. 25, 1982

[87] PCT Pub. No.: WO81/03700
PCT Pub. Date: Dec. 24, 1981

[51] Int. Cl.³ .............................................. G01F 7/00
[52] U.S. Cl. ...................................................... 73/197
[58] Field of Search ................... 73/197, 203

[56] References Cited

U.S. PATENT DOCUMENTS 3,203,238  8/1965  Whittaker et al. ............... 73/197
3,395,578  8/1968  Simonds, Jr. ..................... 73/197
4,100,799  7/1978  Bradham et al. ................. 73/197

FOREIGN PATENT DOCUMENTS 117608  2/1900  Fed. Rep. of Germany ........ 73/197

Primary Examiner—Charles A. Ruehl

[57] ABSTRACT

A compound liquid flow meter comprised of a main flow path incorporating a turbine meter (2,36) and a downstream valve (3,24), and a parallel auxiliary low flow path incorporating a relatively small capacity meter (8,41) and a fixed orifice (16,53) discharging into the main flow path downstream of the valve. The orifice size is selected to cooperate with the diameter and spring characteristics of the valve so that on increasing flow rates the valve begins to open at 45 to 55 percent of the capacity of the low flow meter (8,41) and on decreasing flow begins to close at the same flow rate. The valve action is smooth and does not require, or create, pressure impulses or surges. Furthermore, the balanced relationship between the orifice and the valve virtually eliminates the traditional loss of accuracy associated with the "change over" of prior art compound meters. The valve actuation point is the same at increasing or decreasing flows and the valve is extremely simple containing no links, pivots, cams, or other items requiring adjustment or maintenance. A valve (15) may be connected in the low flow path and operated to limit the flow through that path when the downstream valve (2,24) is open and the flow through the main path is consequently high.

4 Claims, 12 Drawing Figures

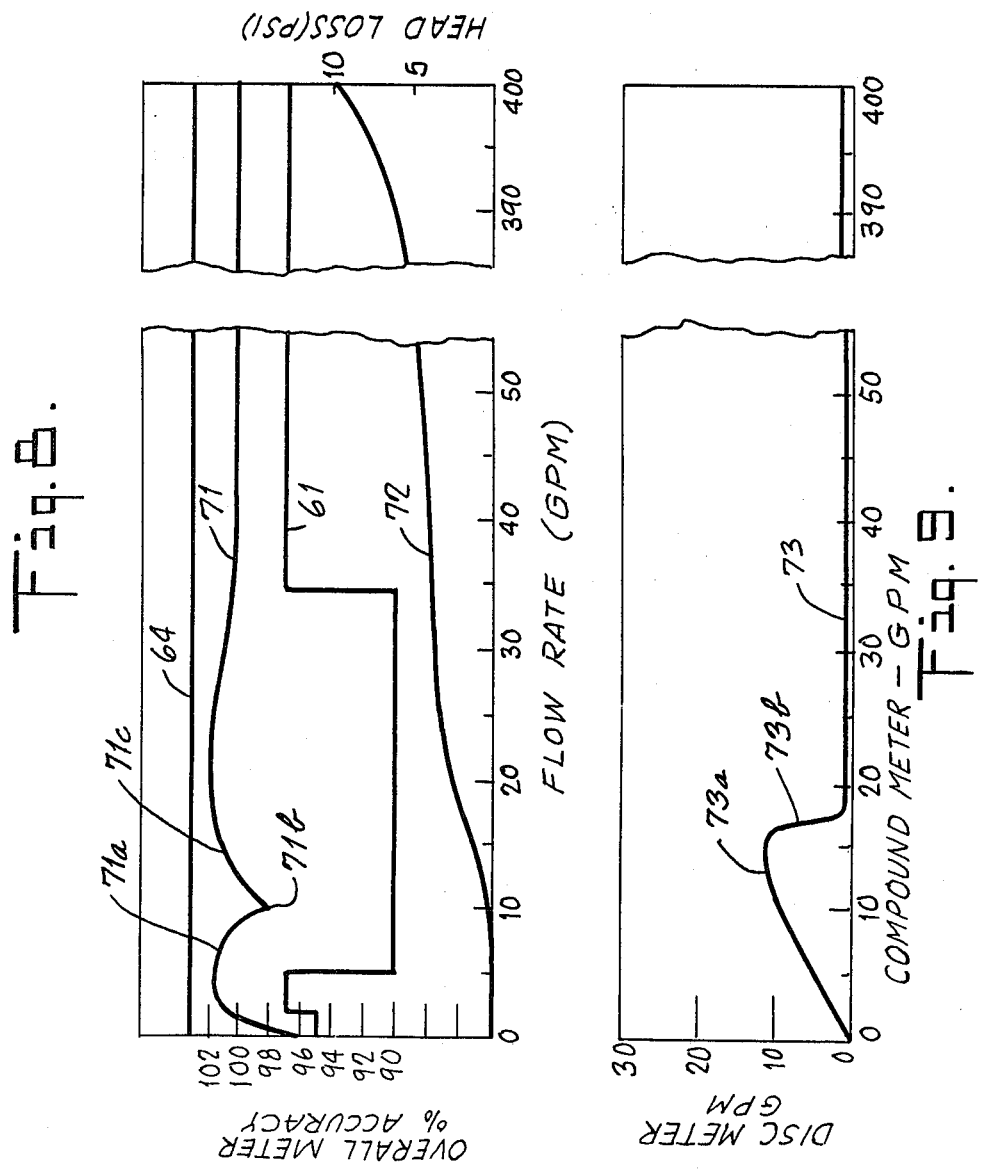

COMPOUND LIQUID FLOW METER

This invention relates to the measurement of liquid flow in closed conduits, where the flow is subject to a wide range of variations.

BACKGROUND

Compound liquid flow meters have parallel flow paths, one of which includes a turbine meter accurate over a wide range of relatively high flow rates, but inaccurate below a known minimum rate. The other flow path includes a meter accurate at low flow rates, but having a narrow range with a low maximum rate of flow greater than the minimum flow rate of the turbine meter. It is essential that the flow path through the turbine meter be closed by a valve during the low range of flow rates where that meter is inaccurate. It has previously been considered necessary to have the valve quick-acting in response to the rate of flow, so that it opens quickly when the flow rate exceeds the minimum accurate flow rate of the turbine meter, and so that it closes quickly when the flow rate falls below that minimum.

Many quick-acting valve mechanisms have been proposed in the prior art. See for example Masson et al. U.S. Pat. Nos. 3,677,084 and Pelt, 4,100,800. The prior art quick-acting valve mechanisms are complex. Masson et al. uses a combined cam and toggle mechanism. Pelt uses a complex mechanism involving two cams and an inclined plane. The prior art compound meters including quick-acting valve mechanisms have reduced accuracy during the crossover range of flows during which the valve is opening or closing. This lack of accuracy is recognized in the standard for such meters published by The American Water Works Association and identified as their Standard C-702-78. That standard allows compound meters to have a minimum accuracy as low as 90% in the crossover range where the valve is opening or closing, but requires that the total crossover range of flow rates where accuracy is below 97% be limited (e.g., 20 gals. per min. for a 3 in. meter).

BRIEF SUMMARY OF THE INVENTION

This compound liquid flow meter has a principal flow path including a wide range turbine meter which is accurate for a range of flows greater than a predetermined minimum flow. The meter also includes a parallel auxiliary flow path through a conventional meter such as a positive displacement meter, which is accurate over a lower range of flow rates. The upper end of that lower range overlaps the low end of the accurate range of flow rates of the turbine meter.

The compound meter includes a casing open along a portion of one side and having an inlet at one end and an outlet at the opposite end. The casing has a transverse wall between the inlet and the outlet, and an aperture in the wall is part of the principal flow path.

A main valve, which is disclosed as a simple poppet valve, controls the flow through the aperture. That valve is mounted on a stem extending through a valve guide which also serves as a retainer for a spring which biases the valve to closed position. When there is no flow through the valve, the total pressure difference between the upstream and downstream sides of the compound meter acts on the valve in a valve-opening direction. The valve assembly including the valve, stem, guide and spring, is mounted on the downstream side of the transverse wall in the casing.

A cover for the open side of the casing supports the turbine meter within the casing on the upstream side of the transverse wall. The turbine meter must be one having a highly accurate characteristic, i.e., one which attains a high and constant accuracy at a rate of flow just slightly above the minimum rate which starts rotation of the turbine. The lower range meter is supported by the cover, which contains the parallel flow path.

The auxiliary flow path must include a fixed orifice of carefully selected size, which determines the pressure drop across the compound meter when the main valve is closed, and hence determines the rate of flow at which the main valve starts to open.

The auxiliary flow path may also include a secondary flow responsive valve which is biased open and closes in response to a predetermined pressure difference across the meters. This flow responsive valve has a minimum opening, so that there is always some flow through the positive displacement meter.

This compound meter provides an improved accuracy during the crossover between the closed main valve position, where only the lower range meter is functioning, and the open main valve position, wherein both meters are functioning. The main valve structure opens smoothly to turn the turbine meter on when the flow is great enough and closes smoothly to turn the turbine meter off when the flow is below the minimum accurate flow for that meter.

This smooth action starts to open the main valve at a predetermined pressure difference equal to the sum of the pressure differences across the orifice, the secondary valve and the low range meter. As the flow rate increases, the accompanying increase in pressure difference across the main valve opens it farther and this pressure difference plus the head due to the stream velocity closes the secondary flow responsive valve, thereby reducing the speed of the low flow meter to a value determined by the minimum opening of that valve. As the flow rate decreases, the secondary valve opens before the main valve closes so that the low rate meter is running at about 50% of its maximum capacity when the main valve closes, after which all flow down to zero is then measured only through the low rate meter.

BRIEF DESCRIPTION OF THE DRAWINGS

FIG. 5a is a fragmentary cross-sectional view taken on the line 5a—5a of FIG. 5.

FIG. 8 is a graphical view similar to FIG. 6, showing an accuracy characteristic of a compound meter constructed in accordance with the present invention.

FIG. 9 is a graphical view similar to FIG. 7, showing the flow characteristic of the low flow meter when used in the compound meter of the present invention.

DETAILED DESCRIPTION

FIG. 1

Figure 1:
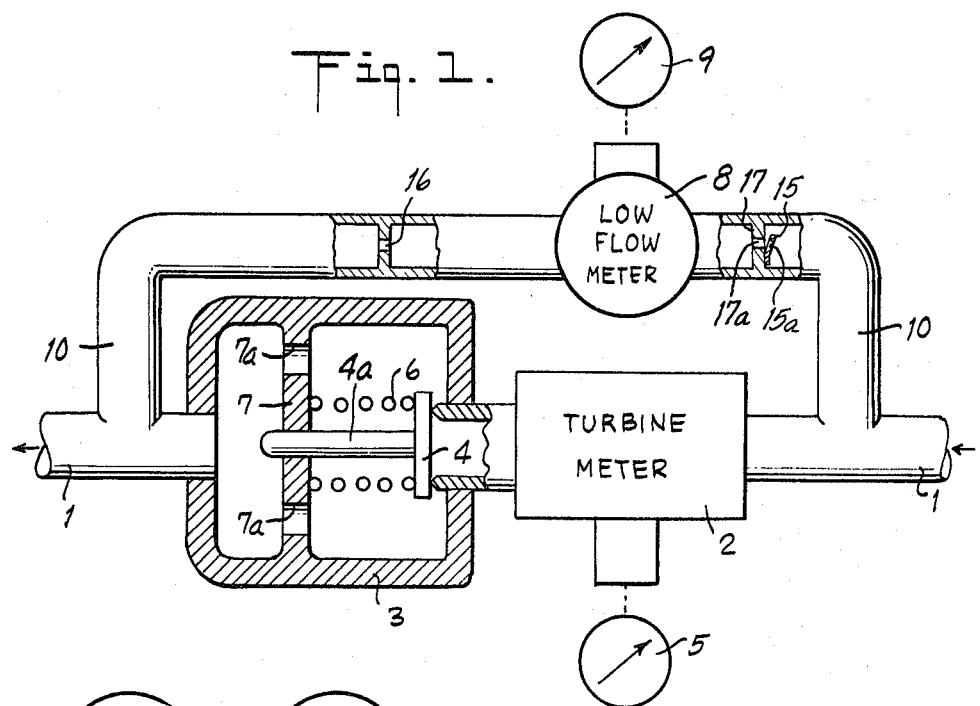
FIG. 1 is a diagrammatic view of a compound meter embodying the invention.
Figure 2:
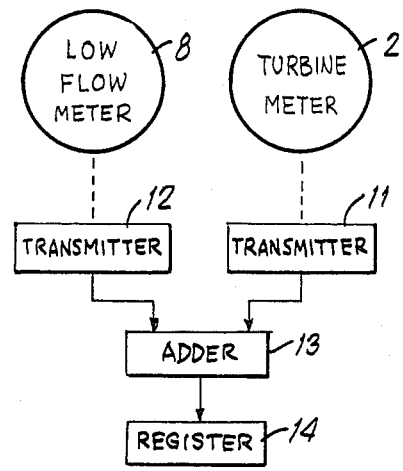
FIG. 2 is a diagrammatic illustration of an alternative register arrangement for the outputs of the two meters in FIG. 1.

This figure diagrammatically illustrates a compound flow meter constructed in accordance with the present invention. The compound meter includes a conduit 1 carrying liquid which flows either through a principal flow path including a wide range turbine meter 2 and a valve mechanism 3 or through a parallel auxiliary flow path 10 including a low flow range meter 8. The turbine meter 2 operates an indicator 5 and the low range meter 8 operates an indicator 9. The total flow through the compound meter is obtained by taking readings from both the indicators 5 and 9 and adding them.

The valve mechanism 3 includes a poppet valve 4 mounted on a stem 4a and biased to closed position by a spring 6. The stem 4a is slidably mounted in an aperture in a wall 7 having other apertures 7a to permit the passage of liquid.

In the auxiliary flow path 10 there is provided, preferably upstream from the meter 8, a valve 15 shown as a leaf spring fixed at one end on a wall 17 having an aperture 17a. Valve 15 is self-biased to an open position and movable to closed position by the pressure difference across the valve. The valve 15 is provided with an aperture 15a, which serves to allow a minimum flow through the meter 8, even when the valve 15 is closed.

Downstream from the meter 8, there is provided a fixed orifice 16 whose diameter is selected so that the pressure drop across it is coordinated with the spring rate of spring 6 to determine the flow rate at which the valve 4 opens.

The pressure drop between the inlet and the outlet of the compound meter is divided in the main flow path between the pressure drop across the main meter 2 and that across the main valve 4. In the auxiliary flow path, the pressure drop between inlet and outlet is the sum of the pressure drops across the valve 15, the meter 8 and the orifice 16.

Figure 11:
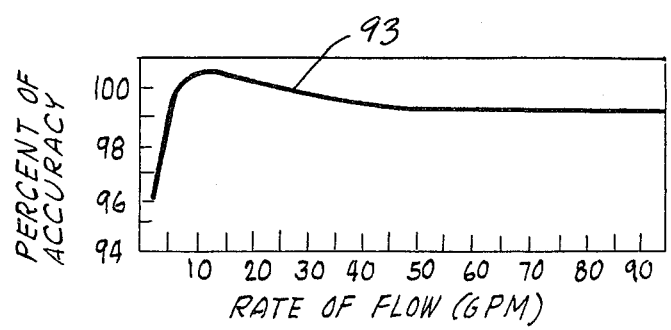
FIG. 11 is a graphical view illustrating an accuracy characteristic of the turbine meter of FIG. 10.

The principal function of the valve 15 is to reduce the flow through the low flow meter 8 after the turbine meter 2 reaches the constant portion of its accuracy characteristic (FIG. 11). It is desirable to reduce the speed of the meter 8 at such times in order to reduce wear by preventing it from running continuously at high speed. On the other hand, it is also desirable to keep it operating at low speed, because the turbine meter in some installations may operate for long periods at high speeds. If the low flow meter is allowed to stop during those periods, it might conceivably become fixed in position and fail to start again when the flow through the turbine meter is reduced.

For those installations where the functions just described are not required, the valve 15 could be omitted.

When there is no flow through the conduit 1, the valve 4 is subjected to the pressure difference between the inlet and the outlet of the compound meter, and the valve is held closed by the spring 6. As the flow increases, that pressure difference increases. At a predetermined rate of flow established by the force of the spring 6 and by the characteristics of the orifice 16 and the low flow meter 8, the pressure difference becomes sufficiently great to initiate an opening movement of the valve 4.

FIG. 2

This figure illustrates diagrammatically an alternative apparatus for determining the sum of the flows through the turbine meter 2 and the positive displacement meter 8. The turbine meter 2 operates a transmitter 11 and the positive displacement meter 8 operates a transmitter 12. The transmitters 11 and 12 drive an adder 13 which in turn drives a register 14. The register 14 indicates the sum of the readings of the two meters. A recorder may be used in place of the register.

FIGS. 3–5

These figures illustrate in detail a preferred embodiment of the present invention. This compound meter includes a casing 20 open at the top, as shown at 20a in FIG. 5, and closed by a cover 21 held in place by bolts 22. A gasket 18 seals the connection between casing 20 and cover 21. The casing 20 has an inlet 20b at the right-hand end, as it appears in the drawing, and an outlet 20c at the left-hand end. A transverse wall 23 extends across the casing 20 midway between the inlet 20b and the outlet 20c and is provided with a central aperture 23a.

Mounted on the transverse wall 23 is a valve assembly 24 including a valve seat 25 extending through the aperture 23a and having a flange 25a engaging the upstream face of the wall 23. A seal ring 26 is provided between the flange 25a and the wall 23. The seat 25 projects through the wall 23. A ring 27 is threaded onto the projecting end of the seat 25. The ring 27 carries a plurality of peripherally spaced studs 30 projecting downstream from the wall 23. A guide and retainer 31 has a flange 31a apertured to engage shoulders on the studs 30. The flange 31a is held in place on the studs 30 by means of nuts 32. The guide and retainer 31 has a deeply dished configuration with a reentrant central cone 31b which serves as a guide for a valve stem 33 supporting a valve 34 which cooperates with the seat 25. A coil spring 35 is held in compression between the valve 34 and the guide and retainer 31.

The cover 21 supports within the casing 20 a turbine meter 36 located on the upstream side of the wall 23. The meter 36 must have sensitivity to low flows, similar to that of the prior art turbine meter 74 illustrated in FIG. 10, with its accuracy characteristic at low flow shown in FIG. 11. The meter 36 drives an upwardly extending shaft 37 carrying at its upper end a rotating permanent bar magnet 38 which drives an indicator 40 (FIG. 3) of conventional construction. The downstream end of meter 36 is sealed to the flange 25a by a molded seal ring 39.

Figure 3:
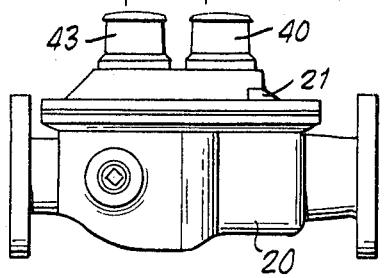
FIG. 3 is an elevational view of a compound meter embodying the invention.
Figure 4:
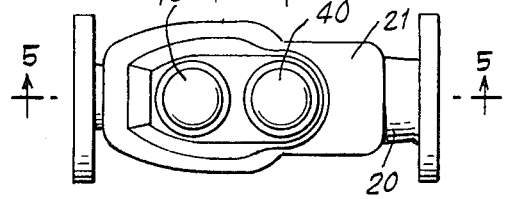
FIG. 4 is a plan view of the meter of FIG. 3.

The cover 21 also carries a low flow meter 41 which may be a conventional positive displacement meter of the nutating disc type. The meter 41 drives another permanent magnet 42 which in turn drives an indicator 43 (FIG. 3). The low flow meter 41 is located entirely within the cover 21, being retained in a chamber whose lower end is closed by a plate 44 held in place by screws 45.

A stud 46 projects downwardly from the cover 21. A bar 47 is fixed on the top of the turbine meter 36 and is attached to the stud 46 by means of bolts 48.

The parallel auxiliary flow path from the inlet 20b through the positive displacement meter 41 may be traced through a narrow space (arrow 50 in the drawing) at the upstream end of the turbine meter 36, thence through a valve 52 mounted on the under side of the cover 21. Valve 52 is best seen in FIG. 5a, and is shown as a simple leaf spring valve self-biased to the open position shown in that figure. The leaf spring valve 52 is provided with an opening 52a aligned with an opening 51a in a transverse wall 51 of the cover 21. As the pressure drop across the valve 52 increases, the valve closes smoothly, whereupon the opening 52a becomes an operative restriction limiting the maximum flow through the meter 41. Transverse wall 51 extends across the cover 21 and is aligned with the transverse wall 23 in casing 20. The auxiliary flow path extends through opening 51a into a chamber containing the positive displacement meter 41. The auxiliary flow path extends from that meter through an exit passage 21b and a restriction 53 of selected dimensions to the outlet 20c.

In assembling the compound meter, the valve assembly 24 is mounted on the transverse wall 23 of casing 20. The meters 36 and 41 are mounted on the cover 21. The assembly consisting of the cover and the two meters may then be put in place on the casing 20. The meter 36 passes through the opening 20a in the top of the casing 20 with adequate clearance on all sides. The cover assembly is then fastened in place with the bolts 22 and the compound meter is complete.

FIGS. 6–7

These figures illustrate the accuracy of typical prior art compound flow meters. The phrase "percent accuracy" as used in this art means a low reading if the figure is below 100% and a high reading if the reading is over 100%.

Figure 6:
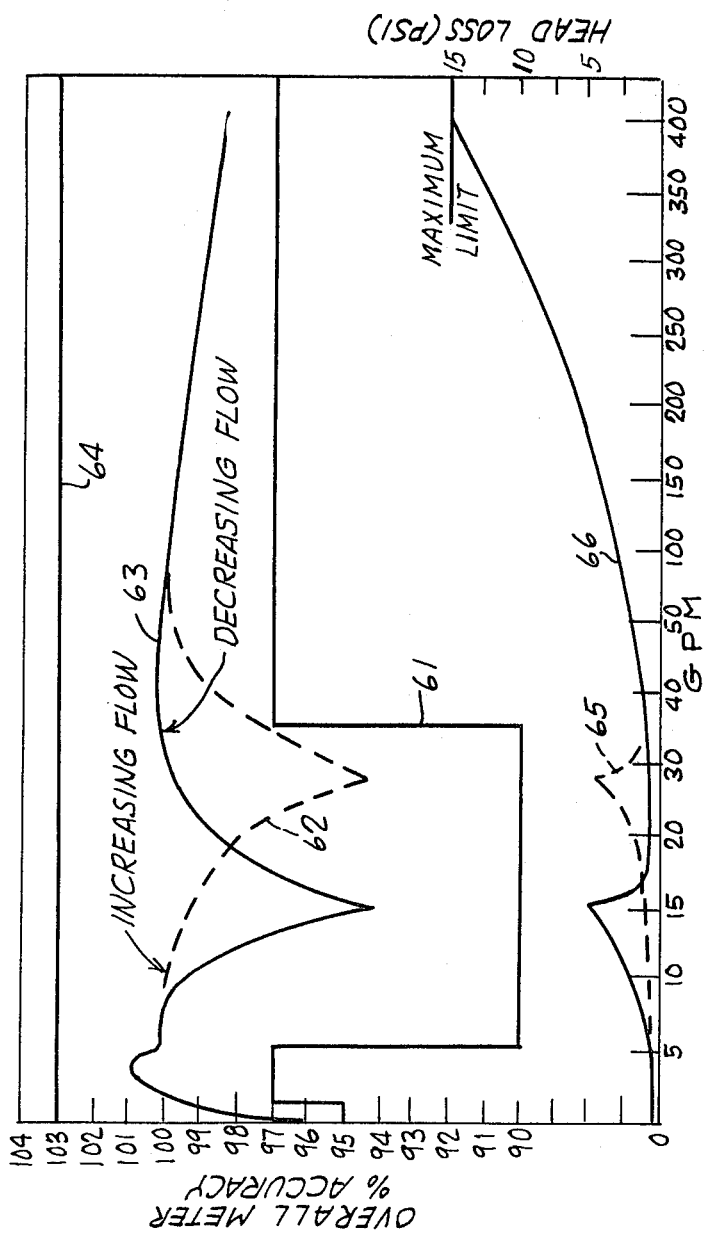
FIG. 6 is a graphical view illustrating a typical accuracy characteristic of a prior art compound meter.

Referring to FIG. 6, the solid line 61 illustrates the acceptable low reading accuracy limit for compound meters as established by the American Water Works Association Standard C-702-78. The straight line 64 shows the acceptable high reading accuracy limit as established by the same standard. There is a region in line 61 between about 6 gallons per minute and 33 gallons per minute where the acceptable low reading accuracy is lowered to 90%, whereas it is maintained elsewhere at 97%, except for the very low end of the range. This is the crossover region where the meter is changing from the positive displacement meter to the condition where both meters are functioning. The dotted line curve 62 shows the accuracy characteristics of a typical prior art compound flow meter under conditions of increasing flow and the solid line curve 63 shows the accuracy characteristics of the same meter under conditions of decreasing flow.

Figure 7:
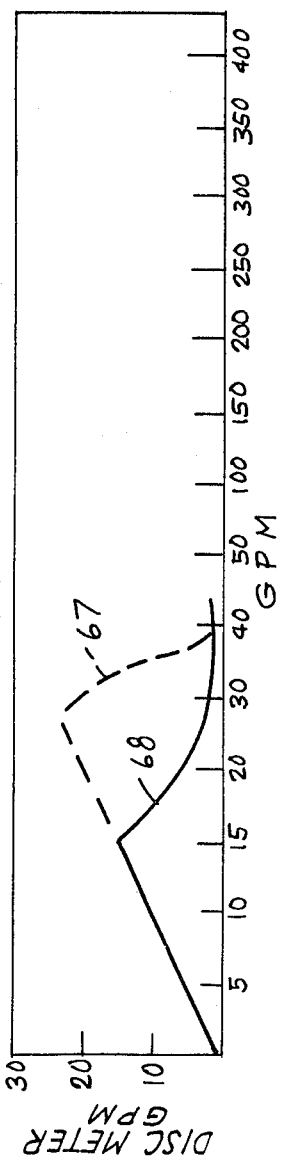
FIG. 7 is a graphical view showing the flow characteristics of a prior art low flow meter when used in a compound meter.

The dotted line curve 65 shows the variation with increasing flow of the head loss across the prior art compound meter. The solid line curve 66 shows the head loss for the same meter during decreasing flow. In FIG. 7, there is illustrated by dotted line 67 the variation in flow through the positive displacement meter under conditions of increasing flow. The full line 68 shows the corresponding flow rate through the positive displacement meter under conditions of decreasing flow.

FIGS. 8–11

FIGS. 8 and 9 correspond to FIGS. 6 and 7 respectively, but show the characteristics of a compound meter of the present invention. In FIG. 8, the lines 61,64 are the same as the lines similarly numbered in FIG. 6, showing the acceptable accuracy limits for a compound meter. The curve 71 shows the accuracy of a meter constructed in accordance with the present invention. That curve is the same for either increasing or decreasing flow. The curve 72 shows the variation with flow of the head loss across a compound meter constructed in accordance with the present invention. The curve 73 in FIG. 9 shows the variation in flow through a low flow meter such as 8 or 41, which may be a positive displacement meter of the nutating disc type, over the whole range of flow to the complete compound meter. The disc meter measures most of the flow up to about 15 gallons per minute, after which the valve 4 or 34 starts to open and flow rate through the disc meter decreases due to the closure of the valve 52 in FIG. 5 or 15 in FIG. 1.

Figure 10:
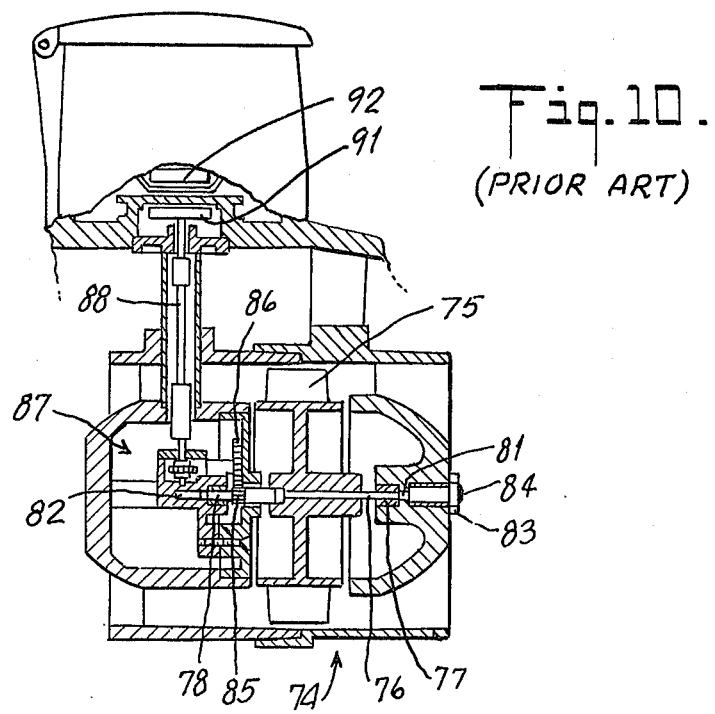
FIG. 10 is a cross-sectional view showing a turbine meter suitable for use in the compound meter of the present invention.

FIG. 10 shows a turbine meter 74 a type known in the art, and is particularly suitable for use in compound meters constructed in accordance with the present invention. The turbine meter 74 of FIG. 10 includes an impeller 75, fixed on a shaft 76 journaled in bearings 77 and 78. The shaft 76 has its ends facing two thrust inserts 81 and 82. The end play of the shaft may be adjusted by a nut 83 which turns on a stud 84 carrying the thrust insert 81. The shaft 76 carries a pinion gear 85 cooperating with a larger gear 86 forming part of a gear train 87 (not shown in detail) which drives a vertical shaft 88 carrying at its upper end a magnet 91 cooperating with another magnet 92 on the opposite side of a fixed wall 93. The magnets 91 and 92 may be arranged as a magnetic coupling in accordance with the patent to Southall, U.S. Pat. No. 3,442,126. The turbine meter 74 accelerates rapidly, once its minimum rate of flow is exceeded, as shown by the steep slope on the low flow portion of the curve 93 in FIG. 11. This rapid acceleration characteristic is achieved by supporting the rotor 75 on a live shaft turning in the spaced bearings 77 and 78, with adjustable end play to limit the endwise load. The reduction gear train between the turbine 75 and the shaft 88 of the magnet 91 gives the impeller 75 a substantial mechanical advantage over the magnet 30 and thus contributes to the high rate of acceleration. Furthermore, any thrust due to the magnet is supported on the bearings which carry the shaft 88, and is not transmitted back to the impeller 75. The magnet 91, shaft 88 and gear train 77 run in clean liquid supplied through a capillary seal so as to reduce further the friction Thus, the impeller 75 starts easily and accelerates quickly to speeds where its accuracy is about 100%, as shown by the curve 93 in FIG. 11.

The disc meter flow curve 73 in FIG. 9 increases gradually from zero flow and reaches a maximum as shown at 73a followed by a sharp decrease in flow as shown at 73b. This sharp decrease is caused by the closure of the valve 52 in FIG. 5 or the valve 15 in FIG. 1. After that valve is closed, the disc meter is maintained running at a low rate for all higher rates of flow through the compound meter. This low rate of flow through the disc meter is for the purpose of preventing it from sticking, possibly from the deposit of minerals from the liquid being measured, which might occur if it were to remain stationary for a long period of time. Referring to FIG. 8, it may be seen that the initial portion 71a of the accuracy curve 71 is due to the low flow meter but that approximately at point 71b, the curve of the turbine meter becomes substantially greater than that through the disc meter and the portion 71c of the curve 71 is substantially all due to the turbine meter.

It is essential, in order to secure the sustained high accuracy characteristic of FIG. 8 in a compound meter, that the turbine meter employed have a characteristic of rapid acceleration in response to increasing flow. It is also essential to use a simple main valve mechanism which opens gradually, as shown at 3 in FIG. 1 or at 34 in FIG. 5.

Figure 5:
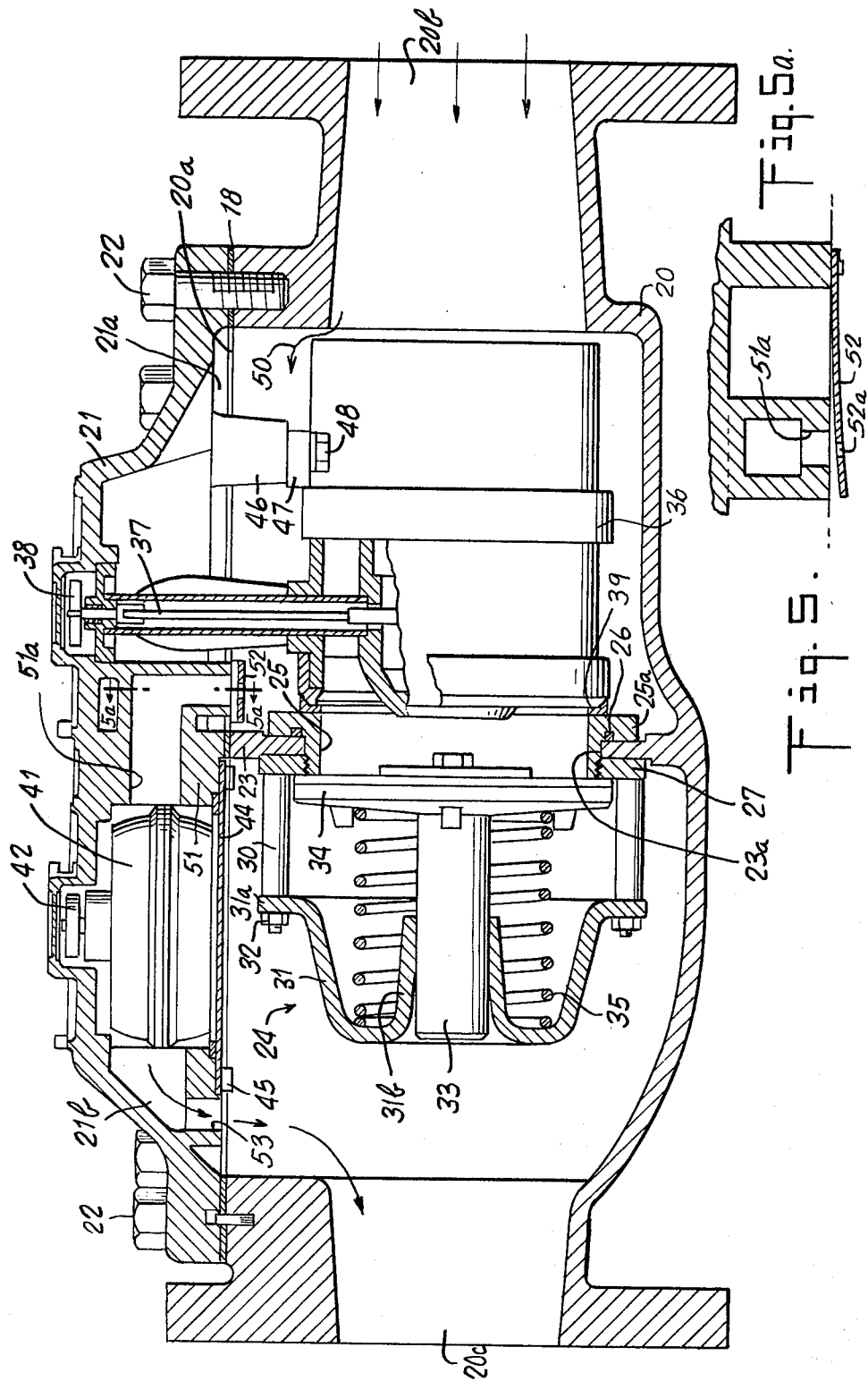
FIG. 5 is a cross-sectional view, on a greatly enlarged scale, taken on the line 5—5 of FIG. 4.

The auxiliary valves 15 of FIG. 1 and 52 of FIG. 5 are both located upstream from the low flow meter and the restrictive orifices 16 of FIG. 1 and 53 of FIG. 5 are located downstream from the low flow meter. It is possible to locate the auxiliary valve either upstream or downstream from the low flow meter. However, any orifice closely upstream from a meter tends to increase the turbulence of flow through the meter, and may disturb its accuracy. The valves 15 and 52 are shown upstream of their respective meters for reasons of convenience.

While the low flow meter has been described as a positive displacement meter of the nutating disc type, other suitable types of low flow meters could be substituted in a compound meter of the present invention.

The particular scales and flow rates cited above and shown in FIGS. 6, 7, 8, 9 and 11 are determined by the size of the meter and are not to be considered as limitations of the invention.

We claim:

1. A compound liquid flow meter including:
   a. a casing open along one side and having at one end and inlet adapted for connection to a supply conduit and at its opposite end an outlet adapted for connection to a discharge conduit;
   b. a cover closing the open side of the casing;
   c. a main flow path through the casing including:
      1. a turbine meter supported by the cover and having a characteristic of accuracy over a first range of flow rates greater than a predetermined rate and of rapid acceleration in response to increasing flow; and
      2. a main valve controlling the flow through the turbine meter;
   d. an auxiliary flow path extending from the inlet to the outlet and including:
      1. a low flow measuring meter supported by the cover and having a characteristic of accuracy over a second range of flow rates lower than and overlapping said first range of flow rates;
      2. an auxiliary valve supported by the cover and controlling the flow through said low flow meter;

wherein the improvement comprises:
   e. a transverse wall in said casing between the inlet and the outlet, said wall having an aperture therein;
   f. means supporting said main valve on the downstream side of the wall so that the main valve controls the flow through the aperture;
   g. spring means biasing the main valve to closed position;
   h. means sealing the downstream end of the turbine meter to the upstream side of the wall at the periphery of said aperture; and
   l. a transverse wall in the cover abutting the transverse wall in the casing, said cover transverse wall having an aperture therethrough forming part of said auxiliary flow path.

2. A compound liquid flow meter as in claim 1, including:
   a. a cylindrical seat extending through said aperture, having a flange abutting the upstream side of the transverse wall and a threaded end downstream from said wall;
   b. a ring threaded on said end of said seat;
   c. an array of peripherally spaced rods projecting downstream from said ring, each said rod having a shoulder facing downstream;
   d. a spring retainer abutting the shoulders on said rods;
   e. means holding the spring retainer against the shoulders; and
   f. said main valve being located within the array of rods and facing the downstream end of said seat;
   g. said spring means being compressed between the retainer and the main valve and biasing the main valve against the seat.

3. A compound meter as in claim 2, in which the accuracy characteristic is within 3% of being 100% accurate over the entire range of flow within the meter capacity.

4. A compound meter as in claim 1, in which the accuracy characteristic is within 3% of being 100% accurate over the entire range of flow within the meter capacity.

* * * * *